T. E. BOCK.
BED.
APPLICATION FILED JAN. 2, 1918.
1,304,650.
Patented May 27, 1919.
2 SHEETS—SHEET 1.
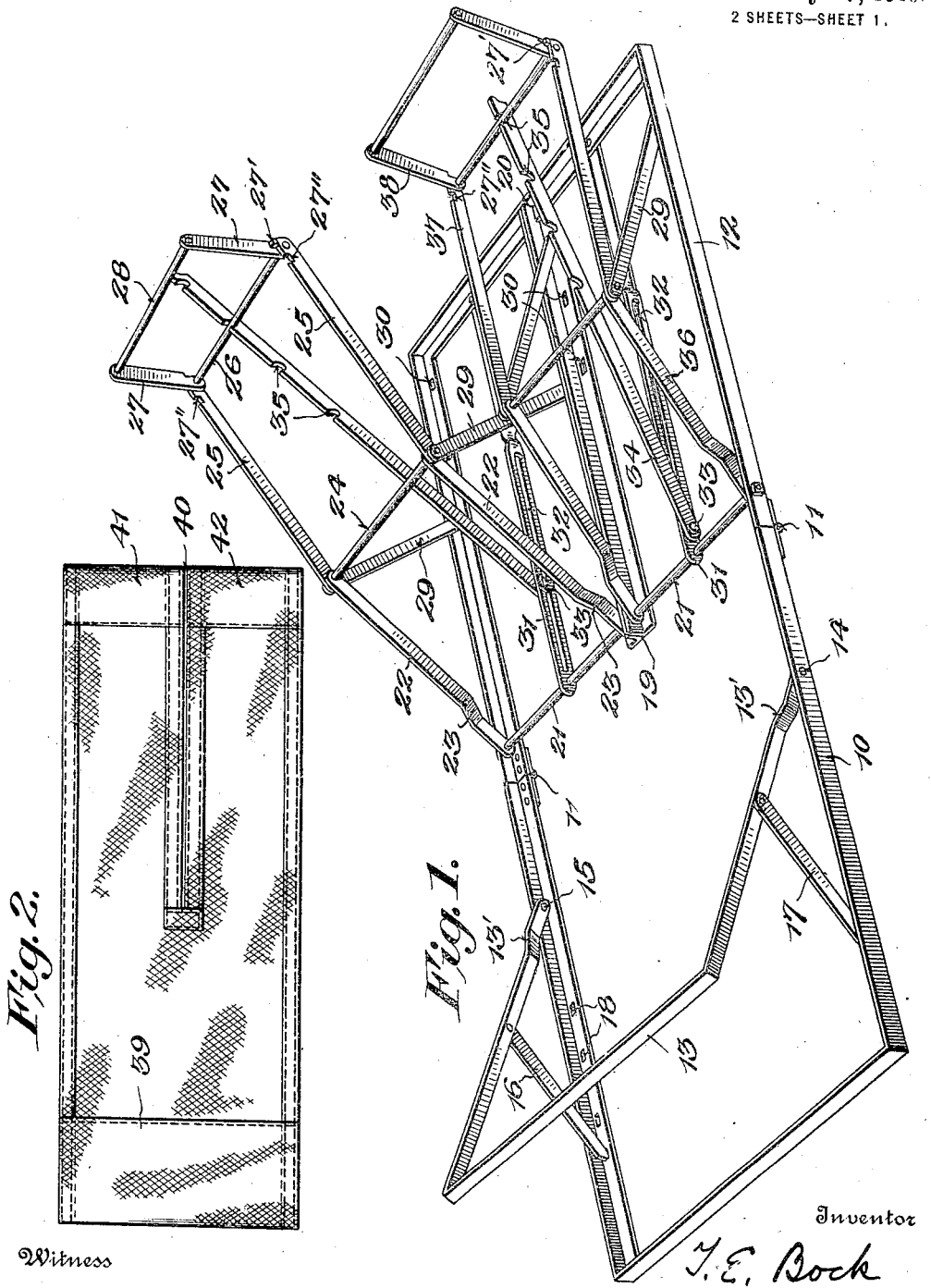
Witness
Chas. L. Griesbauer.
Inventor
T. E. Bock
By
[signature]
Attorney

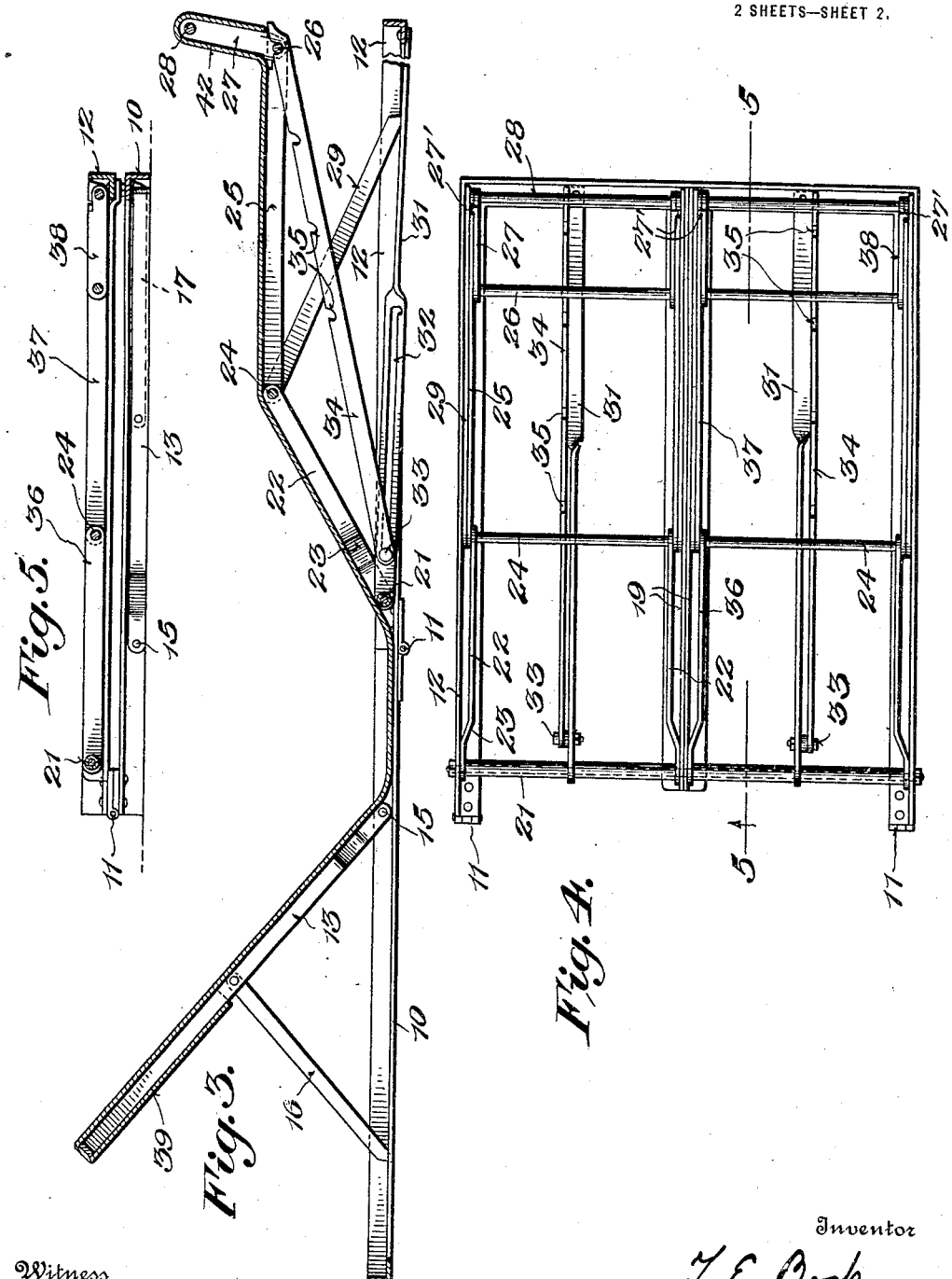

UNITED STATES PATENT OFFICE.

THERESA E. BOCK, OF ROME, NEW YORK.

BED.

1,304,650.

Specification of Letters Patent.

Patented May 27, 1919.

Application filed January 2, 1918. Serial No. 210,027.

*To all whom it may concern:*

Be it known that I, THERESA E. BOCK, a citizen of the United States, and a resident of Rome, county of Oneida, State of New York, have invented certain new and useful Improvements in Beds, of which the following is a specification.

This invention relates to beds and more particularly to portable beds and those having adjustable back and leg rests.

It is one of the objects of the invention to provide a bed which may be folded in a compact arrangement adapted to be conveniently carried. Another object is to provide a bed that is adapted to be used on an ordinary bed and is provided with readily adjustable back and leg rests whereby a patient may be arranged in the required posture for proper treatment of various forms of diseases and injuries.

Other objects and the features of novelty will be apparent from the following description taken in connection with the accompanying drawings, of which:

Figure 1 is a perspective view of a bed embodying my invention;

Fig. 2 is an inverted plan view of the covering;

Fig. 3 is a longitudinal section of the bed shown in Fig. 1; Fig. 4 is a plan view of the same when folded for carrying; and Fig. 5 is a section on line 5—5 of Fig. 4.

Referring to the drawings, 10 indicates one section of the frame of the bed, the section being U-shaped and formed of angle iron, with its ends hinged at 11 to a similar frame section 12. The hinges 11 permit folding of the frame sections 10 and 12 as shown in Fig. 5. A back rest 13 is pivoted to the frame section 10, at the points 14 and 15. The back rest 13 has pivoted to the sides thereof the supporting members 16, 17, the free ends of which are adapted to enter suitable notches 18 in the frame section 10.

The frame section 12 has a bar 19, at the middle thereof, this bar being preferably of T section and having one end secured to the frame section 12, at the point 20, and its other end supported by the rod 21 which extends across the frame section 12 and has its ends secured to the sides thereof. Between the bar 19 and one side of the frame section 12, the rod 21 has pivoted thereon the pair of bars 22, which are offset at the points 23 and have their outer or free ends connected by the rod 24 on which the bars 25 are pivoted. The outer or free ends of the bars 25 are connected by the rod 26 on which the bars 27 are pivoted. The outer or free ends of the bars 27 are connected together by a rod 28 and one or both of these bars has a lug 27' projecting from the side thereof and adapted to coöperate with the upper edge of the adjacent bar 25 to limit the swinging movement of the bars 27, as clearly indicated in Fig. 1. The bars 22 with attached parts constitute an adjustable leg rest which is made up of three jointed sections, one of which comprises the bars 22 and the rod 24. The middle section comprises the bars 25 and the rod 26, and the outer section comprises the bars 27 and rod 28. To the rod 24 the supporting bars 29 are pivoted, the lower ends of which are adapted to enter suitable notches 30 in the frame section 12 and the bar 19. A bar 31, having its ends attached to the frame section 12 and the rod 21, is provided with a longitudinal slot in which a bolt 33 is adjustable. The bolt 33 forms a pivot for the lower end of the bar 34, the upper edge of which has a series of notches 35 adapted to receive the rod 26 to support the middle section of the leg rest in different positions.

Another leg rest, constructed similar to the one just described, comprises the sections 36, 37 and 38.

A covering for the bed is shown in Fig. 2 and at one end is formed with a fold 39 adapted to receive the outer end of the back rest 13, as shown in Fig. 3. The other end of the covering is bifurcated, as indicated at 40, and the ends of the sections are folded, as indicated at 41 and 42 to receive the end sections of the leg rests.

In using the bed, the back rest 13 may be set at any desired angle and by means of the bars 29 and 34 the inner and middle sections of the leg rests may be independently supported in different positions. In Fig. 1 the two leg rests are shown in different positions and it will be understood that by moving the bolts 33 to different positions in the slot 32, the middle sections of the leg rests may be adjusted without affecting the adjustment of the first or inner section. It is intended that the rods 24 shall be under the knees of the patient so that position of the foreleg and foot may be adjusted by means of the bar 34, while the elevation of the knee may be determined by adjustment of the bars 29. The outer section of each leg rest constitutes a foot rest which may be arranged either as shown in Fig. 1 or folded to the position shown in Fig. 5, in which position the lugs 27' are in suitable notches 27", provided therefor in the bars 25. The offsets 23 in the bars 22 permit folding the bars 29 alongside thereof and the parts of the leg rests are otherwise so constructed and arranged that they may be folded in a compact arrangement for carrying, as shown in Fig. 5. The sides of the back rest 13 are also offset, as shown at 13', to permit folding of the bars 16 therealong.

The bed constructed as above described, is adapted for general use in hospitals and elsewhere, and may be placed on an ordinary bed and the parts adjusted to suit the case. The covering may be readily removed for laundrying and by having it bifurcated the leg rests may be independently adjusted and the bed used for cases where feeding by rectum is necessary.

Having thus described my invention, what I claim is:—

1. In apparatus of the class described, the combination of two jointed frame sections, a back rest pivoted to one of said sections, means for supporting said back rest in different positions, two independent leg rests pivoted to the other of said sections and each comprising a plurality of jointed sections adjustable to different positions, supporting means for each leg rest connected at the joint between two sections and adjustable longitudinally of the second mentioned frame section to vary the elevation of said joint, and adjustable supporting means for the ends of said leg sections adapted to support said ends in different positions above and below said joint and independently of the position of said joint.

2. In apparatus of the class described, the combination of two jointed frame sections, a back rest pivoted to one of said sections, means for supporting said back rest in different positions, two independent leg rests pivoted to the other of said sections and each comprising a plurality of jointed sections adjustable to different positions, supporting means for each leg rest connected at the joint between two sections and adjustable longitudinally of the second-mentioned frame section to vary the elevation of said joint, and supporting means for the ends of said leg sections adjustably connected therewith and also adjustable on said second-mentioned frame section whereby said ends may be supported in different positions above and below said joint and independent of the position of said joint.

In testimony whereof I affix my signature.

THERESA E. BOCK.